(12) United States Patent  
Su et al.

(10) Patent No.: US 6,838,889 B2  
(45) Date of Patent: Jan. 4, 2005

(54) METHOD AND APPARATUS FOR REDUCING THE PARACHUTING OF A PROBE

(75) Inventors: Quanmin C. Su, Goleta, CA (US); William I. Russell, Santa Barbara, CA (US)

(73) Assignee: Veeco Instruments Inc., Woodbury, NY (US)

( * ) Notice: Subject to any disclaimer, the term of this patent is extended or adjusted under 35 U.S.C. 154(b) by 237 days.

(21) Appl. No.: 09/761,792

(22) Filed: Jan. 17, 2001

(65) Prior Publication Data

US 2002/0093349 A1 Jul. 18, 2002

(51) Int. Cl.⁷ .............................................. G01B 21/30
(52) U.S. Cl. ...................................................... 324/750
(58) Field of Search ............................... 324/750–765; 250/71.1, 306, 307; 73/105

(56) References Cited

U.S. PATENT DOCUMENTS

| | | | | |
|---|---|---|---|---|
| 5,150,035 A | * | 9/1992 | Nose et al. | 324/71.1 |
| 5,329,236 A | * | 7/1994 | Gemma et al. | 324/453 |
| 5,700,953 A | * | 12/1997 | Hlady et al. | 73/105 |
| 5,773,824 A | * | 6/1998 | Flecha et al. | 250/306 |
| 5,965,881 A | | 10/1999 | Morimoto et al. | |
| 6,008,489 A | | 12/1999 | Elings et al. | |
| RE36,488 E | | 1/2000 | Elings et al. | |
| 6,281,495 B1 | * | 8/2001 | Kitamura | 250/306 |
| 6,353,221 B1 | * | 3/2002 | Elings | 250/306 |

* cited by examiner

Primary Examiner—Vinh P. Nguyen
(74) Attorney, Agent, or Firm—Boyle Fredrickson Newholm Stein & Gratz S.C.

(57) ABSTRACT

A method and apparatus for reducing the parachuting of a probe used in an atomic force microscope. The apparatus includes an oscillating probe, a phase detection circuit coupled to the oscillating probe, and a probe drive boosting circuit coupled to the phase detection circuit and the probe, wherein the phase detection circuit detects a reduction of a variation of a phase signal from the probe and the probe drive boosting circuit boosts a signal to the probe based on the phase signal detected by the phase detection circuit to produce a boosted probe drive signal. The phase detection circuit includes a precision full wave rectifier, and an envelope detector coupled to the precision full wave rectifier, wherein the precision full wave rectifier rectifies a phase signal of the probe to produce a rectified phase signal and the envelope detector detects the rectified phase signal to produce an envelope detected signal. The phase detection circuit further includes a comparator coupled to the envelope detector, and an event detector and hold off circuit coupled to the comparator, wherein the comparator and the event detector and hold off circuit generate an event signal from the envelope detected signal.

19 Claims, 12 Drawing Sheets

METHOD AND APPARATUS FOR REDUCING THE PARACHUTING OF A PROBE

BACKGROUND OF THE INVENTION

1. Field of Invention

The present invention is directed to scanning probe microscopy. More particularly, the present invention is directed to a method and apparatus for reducing the parachuting of a probe used in an atomic force microscope.

2. Description of Related Art

Scanning probe microscopes are used to make extremely high resolution measurements. An oscillating cantilever or probe is used to scan a sample surface and obtain information representative of the surface. Activity of the probe responsive to surface variations is monitored by a detection system. The detection system is typically an optical beam system. The height of the probe relative to the sample surface is then adjusted to maintain constant one or more probe operational parameters based on the monitored activity. Piezoelectric positioners are often used to adjust the height of the probe relative to the sample surface. Correlation of the adjustment amount in the Z direction versus the position of the probe along the surface in the X and Y directions is used to create a map of the surface.

Unfortunately, as the probe traverses the surface of the sample, the probe may not accurately follow the surface, particularly at abrupt drop-offs or ledges in the surface where the probe will tend to depart from and "parachute" over some portion of the surface. For example, when the probe reaches a drop off in the surface, the probe will only gradually lower itself again to the surface (the bottom of the drop-off) as the probe continues its scan, instead of immediately dropping to the surface below the ledge. This parachuting effect causes abrupt vertical drops that actually exist in the surface to be erroneously represented as gradual surface changes.

In particular, in current configurations of Tapping™ AFM scanning probe control, a probe is set to tap the surface at a constant oscillating amplitude. The change in the probe tapping amplitude, or other probe operational parameter, is used as a feedback error signal. As the cantilever probe traverses off an abrupt ledge or edge of a plateau, the cantilever leaves the surface, i.e., parachutes. Accordingly, the probe's oscillation amplitude will grow until the error is sufficiently large to cause a vertical ("Z") motion piezo to respond and lower the cantilever towards the surface, reestablishing the pre-set amplitude, or other operational parameter. The duration of amplitude growth, and therefore error generation, can be quite long such that while the probe remains off the surface, surface features are passed by and not measured. To compensate for prolonged and slow error generation, and in an attempt to lower the probe to the surface more quickly so that surface features are not missed, the gain of the feedback error signal can be increased but this causes the tip to tap hard on the surface. Such hard tapping reduces error growth time and shortens the free parachuting state of the cantilever but causes other problems. Hard tapping causes the tip to impact the surface with great force which quickly results in damage to the tip and/or sample. Hard tapping is particularly damaging if the tip runs into an upward sloping feature where the probe slams into the surface and damages the tip and/or sample. Finally, these problems are exacerbated as scan rates increase.

SUMMARY OF THE INVENTION

The present invention provides a method and apparatus for reducing the parachuting of a probe in an atomic force microscope. The apparatus includes an oscillating probe, a phase detection circuit coupled to the oscillating probe, and a probe drive boosting circuit coupled to the phase detection circuit and the probe. The phase detection circuit detects the phase signal corresponding to parachuting of the probe, and the probe drive boosting circuit boosts a signal to the probe based on the phase signal detected by the phase detection circuit to produce a boosted probe drive signal.

The phase detection circuit includes a precision full wave rectifier and an envelope detector coupled to the precision full wave rectifier, wherein the precision full wave rectifier rectifies a phase signal of the probe to produce a rectified phase signal and the envelope detector detects the rectified phase signal to produce an envelope detected signal. The phase detection circuit further includes a comparator coupled to the envelope detector, and an event detector and hold off circuit coupled to the comparator, wherein the comparator and the event detector and hold off circuit generate an event signal from the envelope detected signal. The phase detection circuit farther includes a multiplier coupled to the event detector and hold off circuit, wherein the multiplier combines the event signal with a probe drive signal to produce the boosted probe drive signal.

The apparatus further includes an event level setting circuit coupled between the event detector and hold off circuit and the multiplier, wherein the event level setting circuit sets an event level of the event signal. The boosted probe drive signal is boosted to a level 20 to 30 percent higher than the probe drive signal. This higher level is adjustable. The event detector and hold off circuit delays generation of the event signal for a predetermined time.

The method includes scanning the surface of the sample with an oscillating probe, detecting a reduction of a variation of a phase signal of the probe indicative of free oscillation of the probe, and increasing a rate of the probe response to steep variations of sample surface features.

The detecting step further includes rectifying the phase signal of the probe to produce a rectified phase signal, and envelope detecting the rectified phase signal of the probe to produce an envelope of the detected phase signal of the probe. The increasing step further includes boosting a drive signal of the probe to produce a boosted drive signal of the probe in the event of parachuting. The detecting step also further includes triggering an event signal based on the detected phase signal, and the boosting step further comprises boosting the drive signal of the probe by combining the event signal with the drive signal of the probe to produce a boosted drive amplitude signal. The boosted drive signal is 20 to 30 percent of the drive signal above the drive signal.

The present invention locates the parachuting (free oscillation) event by using phase criteria and boosts the probe drive signal to expedite error generation. Since the probe drive signal is only boosted during the parachuting event, the tip is able to continue to tap lightly without sacrificing scanning speed. Consequently, probe parachuting is reduced or eliminated without causing hard tapping and thus without damaging the tip and/or sample.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

When a scanning probe of a Tapping™ AFM taps the surface of a sample there are several operational parameters of the probe that can be detected and used to measure surface properties. One such operational parameter is the oscillation amplitude of the tapping cantilever. Another operational parameter is the phase difference between a sinusoidal drive signal and a cantilever response signal. When the cantilever is oscillating freely in air ("free oscillation"), the phase is approximately 90 degrees. When the probe is tapping the surface, the phase varies significantly. The deviation of the tapping phase from the free oscillation phase is normally a few tens of degrees with the sign depending on repulsive or attractive tip/surface interaction. As a result, the free oscillating state of the cantilever is uniquely defined as the state which holds a 90 degree phase. In the figures provided, the phase is plotted with a 90 degree offset so that free oscillation appears at zero degrees.

Figure 1:
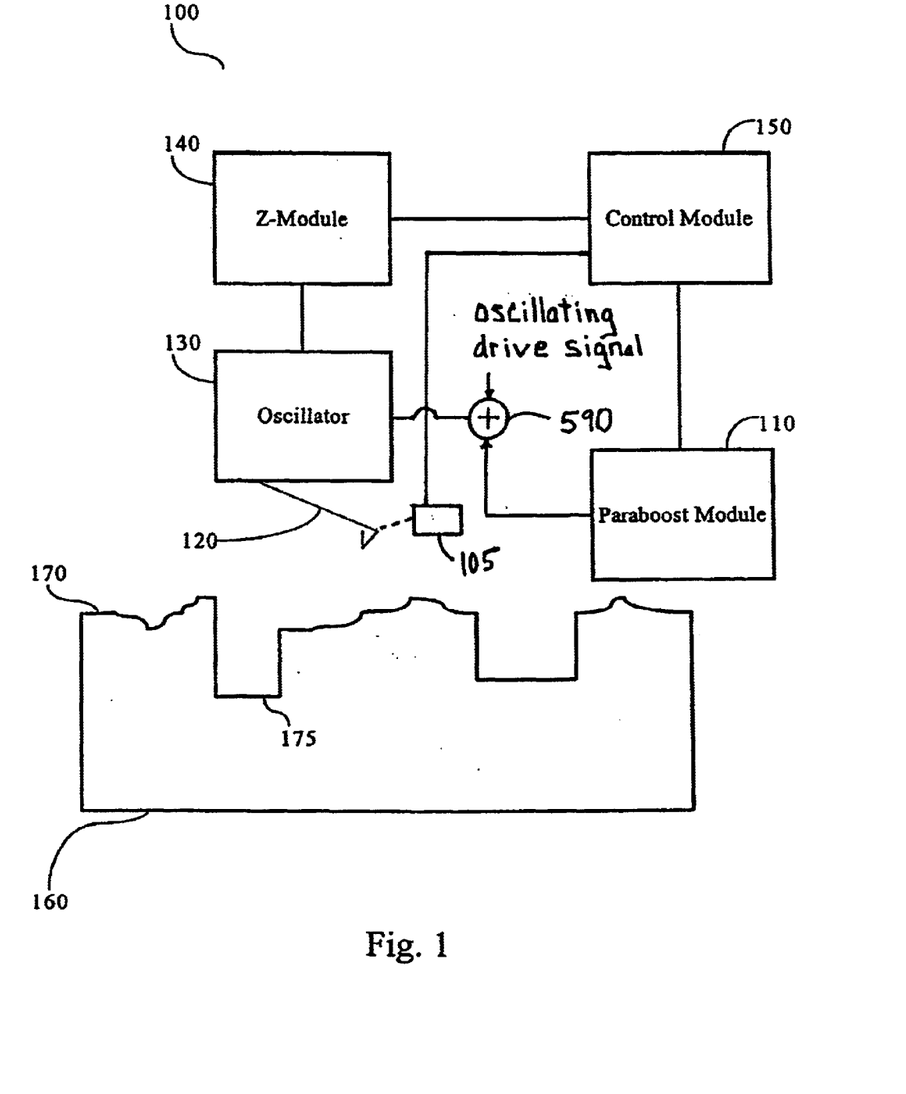
FIG. 1 is an exemplary block diagram of a paraboost system for reducing the parachuting of a probe.

FIG. 1 is an exemplary block diagram of a paraboost system 100 for reducing the parachuting of a probe. The paraboost system 100 includes a paraboost module 110, a probe 120 including a cantilever and a tip, an oscillator 130, a Z-module 140, a control module 150, a sample 160, and a surface 170. The Z-module 140 is a mechanism which causes the probe to approach and separate from the surface 170, such as a Z-axis piezoelectric element that changes a distance between the probe 120 and the surface 170. The Z-module adjusts either the distance of the probe relative to the surface or the surface relative to the probe. The oscillator 130 preferably oscillates the probe 120 so as to intermittently contact the surface 170 in accordance with this assignee's Tapping™ AFM to map the surface 170.

In overview, the paraboost module 110 detects operation of the probe 120, including parachuting of the probe 120 and, indirectly, boosts an error signal sent to the control module 150. The control module 150 controls movement and location of the probe 120 with respect to the surface 170. In particular, the control module 150 controls the distance between the probe 120 and the surface 170 based on detected operational parameters of the probe. The control module 150 may include an additional signal processor which operates in response to error signals from the paraboost module 110. For example, the control module 150 may integrate an error signal from the paraboost module 110 caused by under or over oscillation of the probe 120. The control module 150 then adjusts the distance between the probe 120 and the surface 170 to compensate for the error signals. For example, the control module 150 lowers the probe 120 if the paraboost module 110 or another sensor detects that the probe 120 is too far from the surface. 170.

In a preferred embodiment, the probe 120 oscillates and taps the surface 170 at a predetermined set point amplitude. The probe also has a free amplitude oscillation when it is away from the surface 170 (i.e., oscillating in air). The set point amplitude of oscillation of the probe 120 when it taps the surface 170 is usually 70%–90% of the free oscillation amplitude. To obtain an accurate map of the surface 170, it is desired to keep the tapping amplitude of oscillation constant as the probe scans the surface, i.e., to return it to the set point oscillation amplitude if it strays. Accordingly, when an operational parameter of the probe 120, such as amplitude of oscillation changes (e.g., decreases) indicating that the probe is too close to the surface 170, the Z-module 140 retracts the probe 120 from the surface 170 until the probe again oscillates at its set point. Likewise, when the amplitude of oscillation of the probe 120 increases above the set point, indicating that the probe 120 is too far from the surface, the Z-module 140 lowers the probe 120 towards the surface 170 to again reestablish the amplitude of oscillation at the set point.

In controlling the Z-module, the paraboost module 110 processes oscillation amplitude, phase, and or other properties of the probe 120. These properties are detected, for example, by processing the signals produced by any number of standard detector schemes 105, such as a laser reflecting off the back side of the cantilever and onto a bi-cell or quad detector. An error signal from the detector is sent to the control module 150. If the oscillation amplitude of the probe 120 is too high, for example, the non-zero error signal is integrated and accumulated by the control module 150. When enough error signal is integrated, the control module 150 commands the Z-module 140 to lower the probe 120 towards the surface 170. The error is integrated so that abrupt changes are not detected too quickly, which may cause the Z-module 140 to engage in unwanted oscillation. If the probe 120 encounters a deep recess 175 in the surface 170, it is desirable to lower the probe 120 to the bottom of the recess 175 as quickly as possible. In conventional devices, this is accomplished by increasing the gain of the error signal. Unfortunately, high gain makes the system susceptible to instability of the Z-module. In the present invention, however, no such Z-module instability occurs when the probe is lowered quickly because instead of increasing gain of the error signal, probe oscillation is increased by boosting the probe drive signal. This causes the error signal to accumulate more rapidly in the control module 150 which causes the Z-module 140 to lower the probe 120 more rapidly. Therefore, the Z-module 140 responds to and reduces parachuting of the probe 120 without causing the probe to oscillate or become unstable.

According to a preferred embodiment, the paraboost module 110 detects parachuting of the probe 120 by detecting properties of the phase of the probe 120. In particular, the present invention takes advantage of the fact that the phase of the probe oscillation is distinctly different when the probe 120 is tapping surface 170 than when it begins to freely oscillate. During tapping the phase is "noisy," while during free oscillation the phase quiets. Therefore, parachuting can be detected when the phase of the probe 120 becomes quiet.

Figure 2:
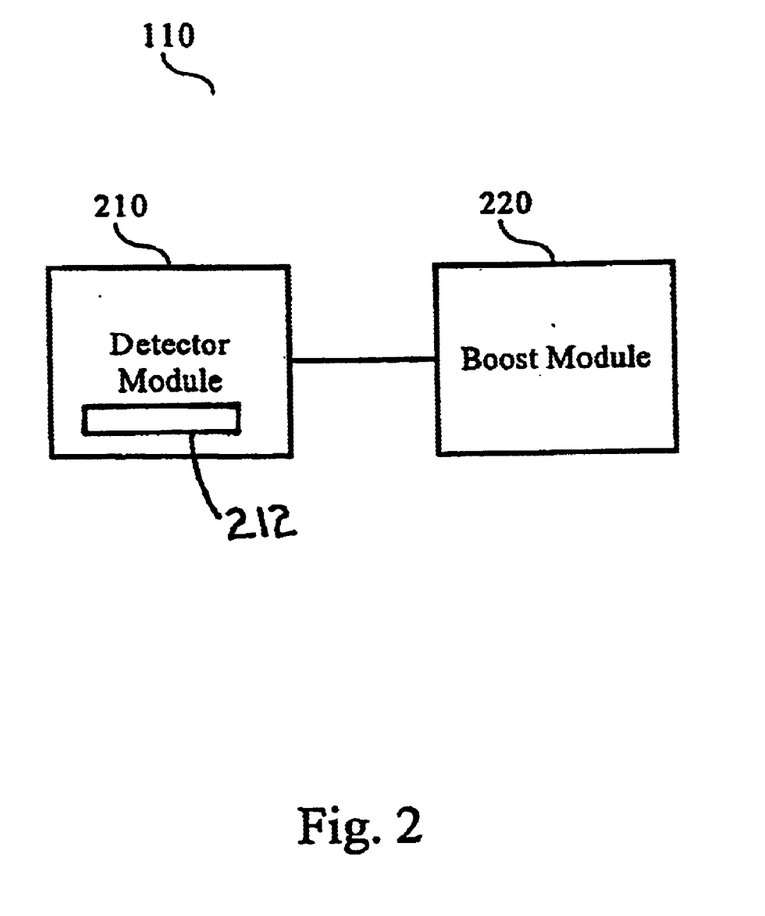
FIG. 2 is an exemplary block diagram of a paraboost module according a preferred embodiment.

FIG. 2 is an exemplary block diagram of a paraboost module 110 according to a preferred embodiment. The paraboost module 110 includes a detector module 210 and a boost module 220. In operation, the detector module 210 detects the phase of the oscillating probe 120 with a phase detection circuit 212. When the detector module 210 detects the reduction of a vibration of the phase signal from the probe 120, the detector module 210 instructs the boost module 220 to increase the oscillator 130 drive signal supplied to the control module 150 to increase the amplitude of the oscillating probe 120. By boosting the drive to the oscillating probe 120, the vibration amplitude of the cantilever 120 is increased, the error signal is increased, and the control module 150 integrates the error more quickly. Accordingly, the Z-module 140 is instructed to lower the probe 120 towards the surface 170 faster.

Figure 3:
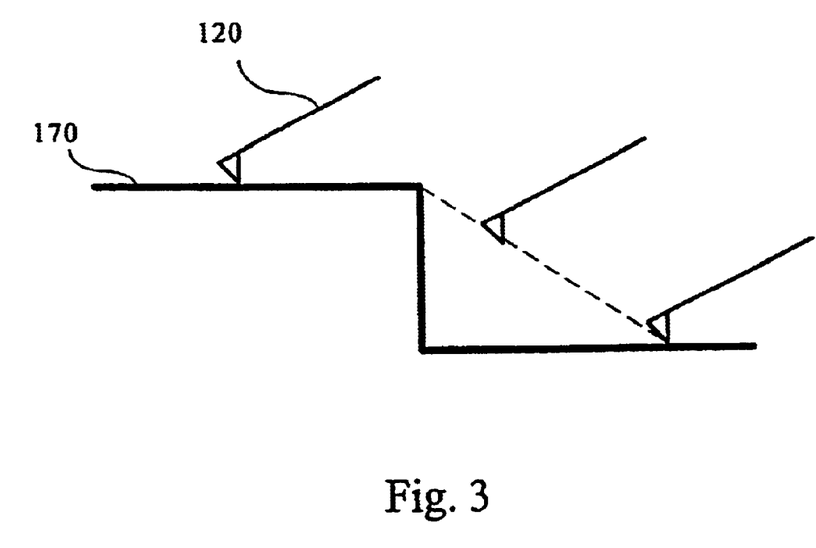
FIGS. 3 is an exemplary illustration of probe operation without a paraboost module.
Figure 4:
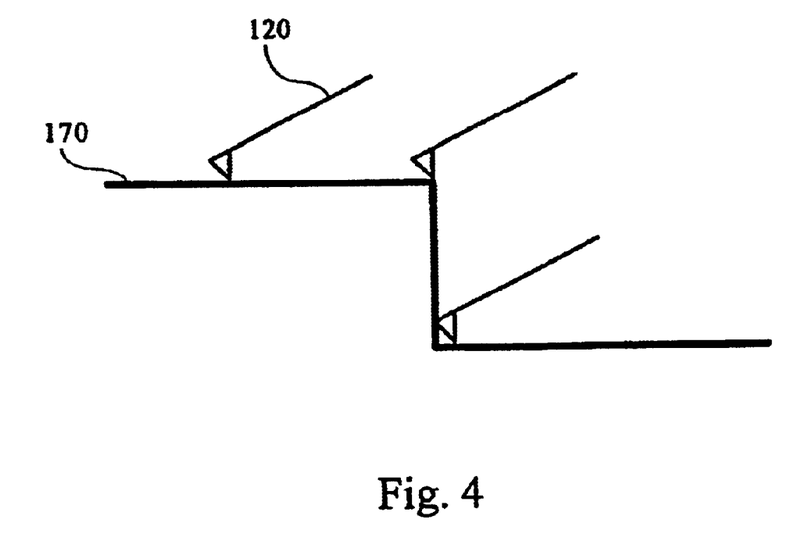
FIG. 4 is an exemplary illustration of probe operation with a paraboost module.

FIGS. 3 and 4 are exemplary illustrations of the desirable effects of the paraboost module 110. FIG. 3 illustrates a probe 120 scanning a surface 170 from left to right without using the paraboost module 110. As illustrated, when the probe 120 reaches an edge of the surface 170, the probe 120 gradually lowers along the dotted line to the bottom of the surface 170. Therefore, the edge of the surface 170 is not properly detected and mapped. FIG. 4 illustrates the scanning of a surface 170 with the probe 120 from left to right using the paraboost module 110. As illustrated, the probe 120 quickly reacts to the edge of the surface 170.

Figure 5:
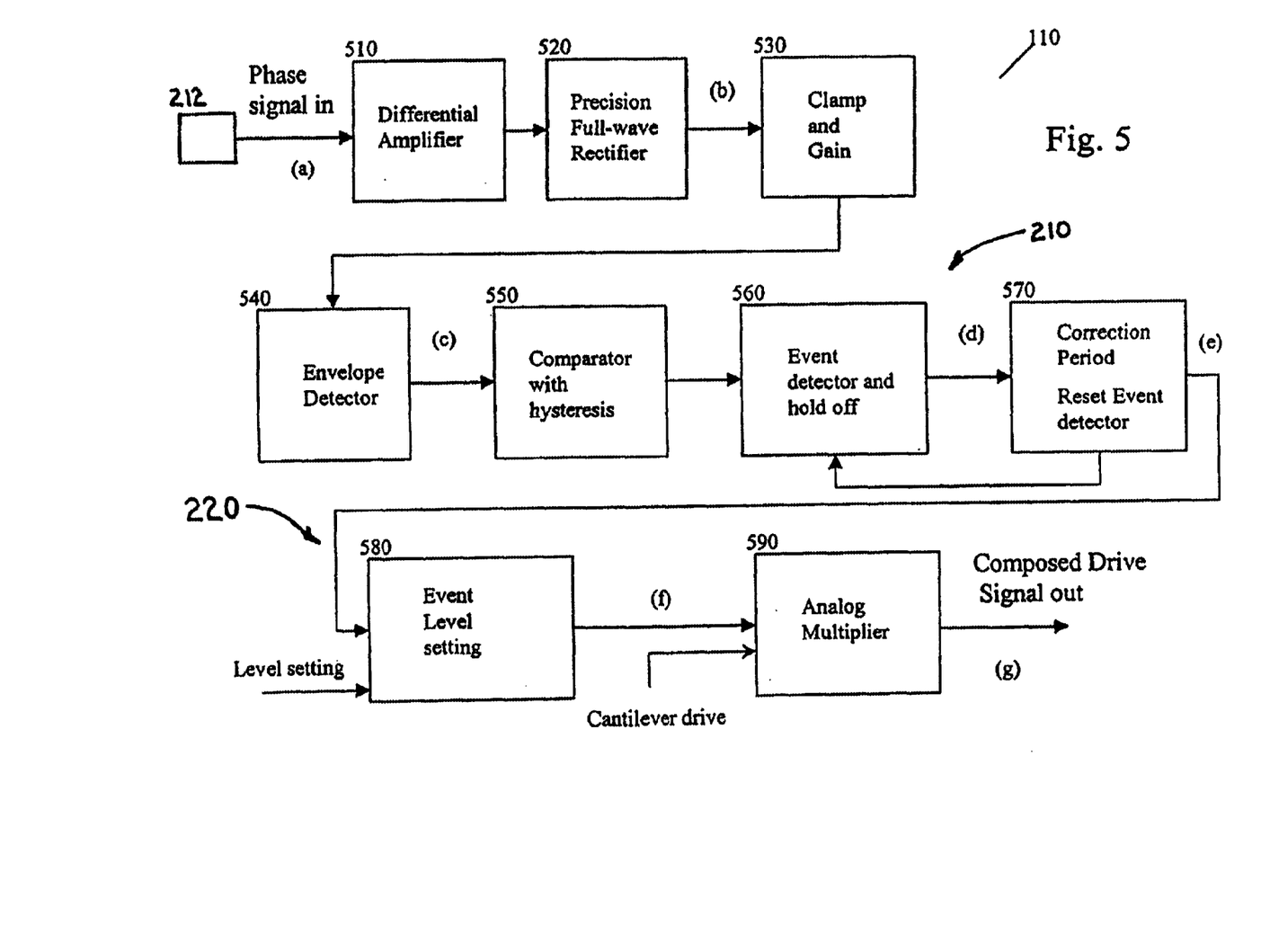
FIG. 5 is an exemplary block diagram of the paraboost module according to a preferred embodiment.

FIG. 5 is an exemplary block diagram of the paraboost module 110 according to a preferred embodiment. The paraboost module 110 includes a detector module 210 having a phase detection circuit 212, a differential amplifier 510, a precision full-wave rectifier 520, a clamp and gain circuit 530, an envelope detector 540, a comparator with hysteresis circuit 550, an event detector and hold off circuit 560, a correction period and reset event detector circuit 570, and a boost module 220 having an event level setting circuit 580, and an analog multiplier 590. FIGS. 6-10 are exemplary illustrations of a phase signal at stages a–g of the paraboost module 110.

Figure 6:
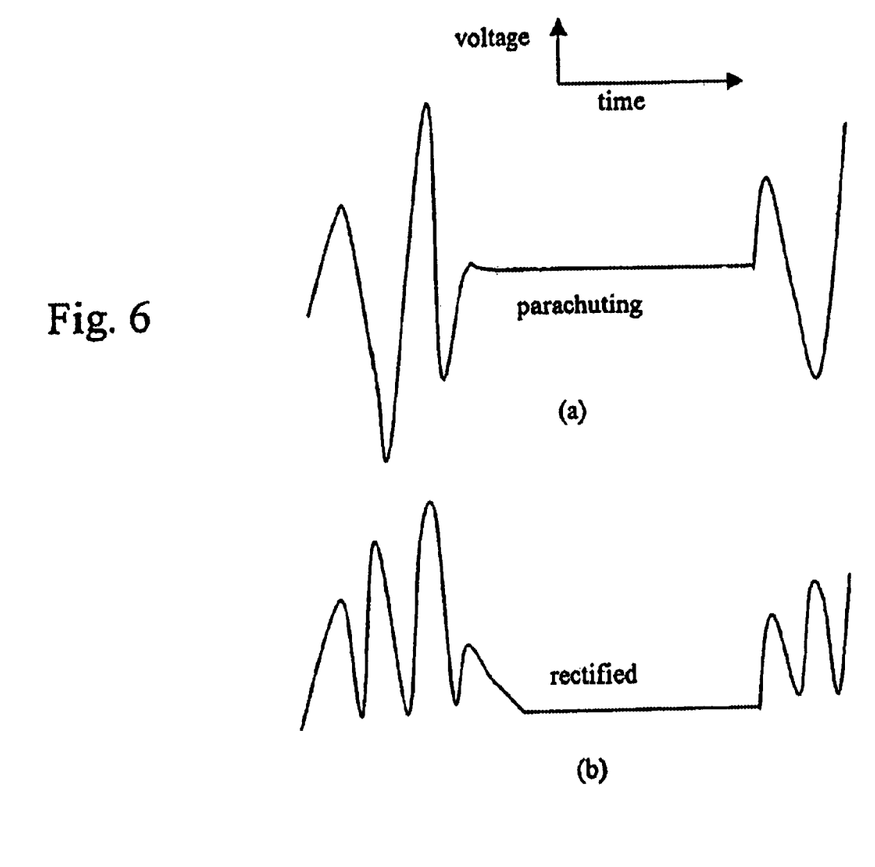
FIGS. 6-10 are exemplary illustrations of a phase signal at stages a–g of the paraboost module.
Figure 7:
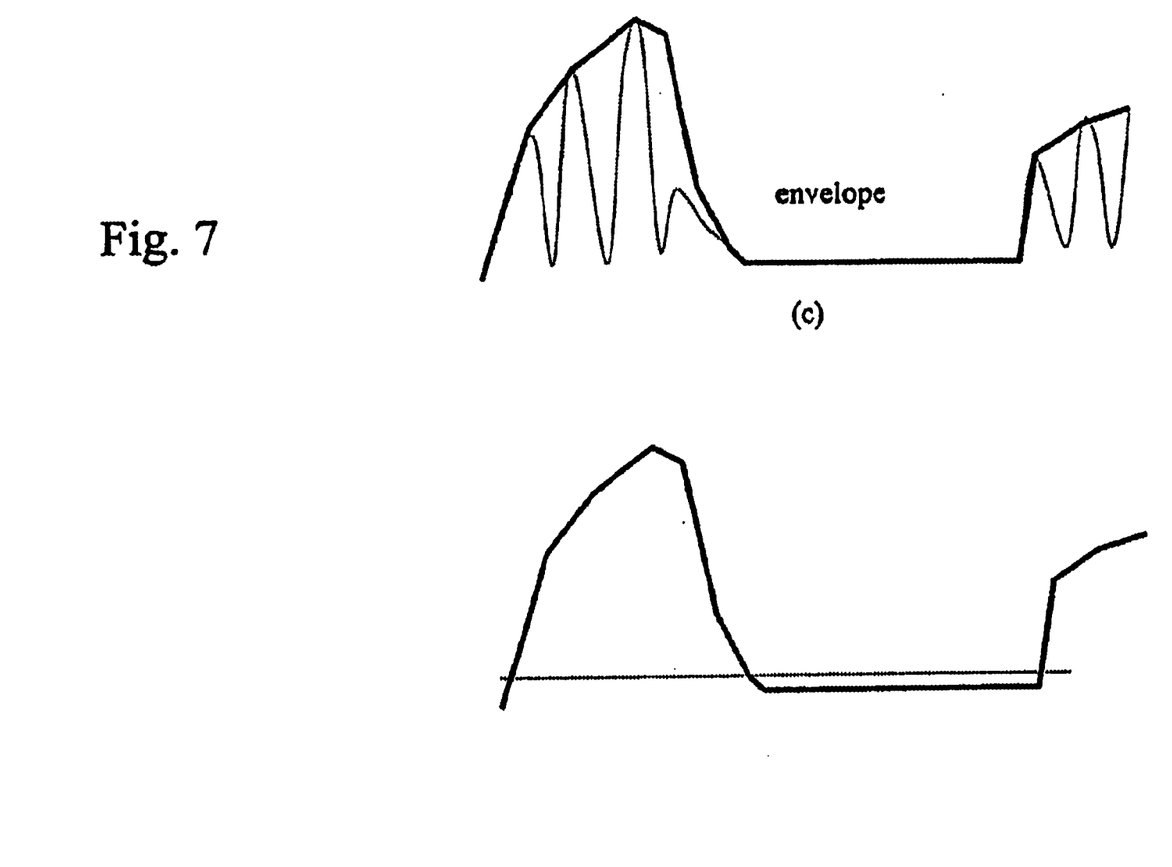

In operation, the paraboost module 110 detects parachuting of the probe 120 based on the probe phase signal when the phase signal quiets as illustrated in FIG. 6, waveform (a). In particular, the phase signal waveform (a) enters the paraboost module 110 through the differential amplifier 510 at location (a). The differential amplifier 510 is useful to reduce noise of the signal when the paraboost module 110 is relatively far from the sensors detecting the phase of the probe 120. The amplified phase signal then enters a precision full-wave rectifier 520 and then is rectified to produce full-wave rectified waveform (b). Waveform (b) then enters a clamp and gain circuit 530 and proceeds through an envelope detector 540 which converts the ragged edges into perimeter edges to produce the envelope detected waveform (c) illustrated in FIG. 7.

The event detector and hold off circuitry 560 prevents false triggering. In other words, the event detector and hold off circuitry 560 waits a set amount of time before signaling a no-phase condition. For example, the event detector and hold-off circuitry 560 can ignore events less than 1 ms in duration for cantilevers with 100 kHz resonance frequency and Q 100. The holding time can be shorter if the cantilever resonance frequency is higher. The waveform (c) then enters the comparator with hysteresis 550 and proceeds through the event detector and hold off circuitry 560 to produce waveform (d).

Figure 8:
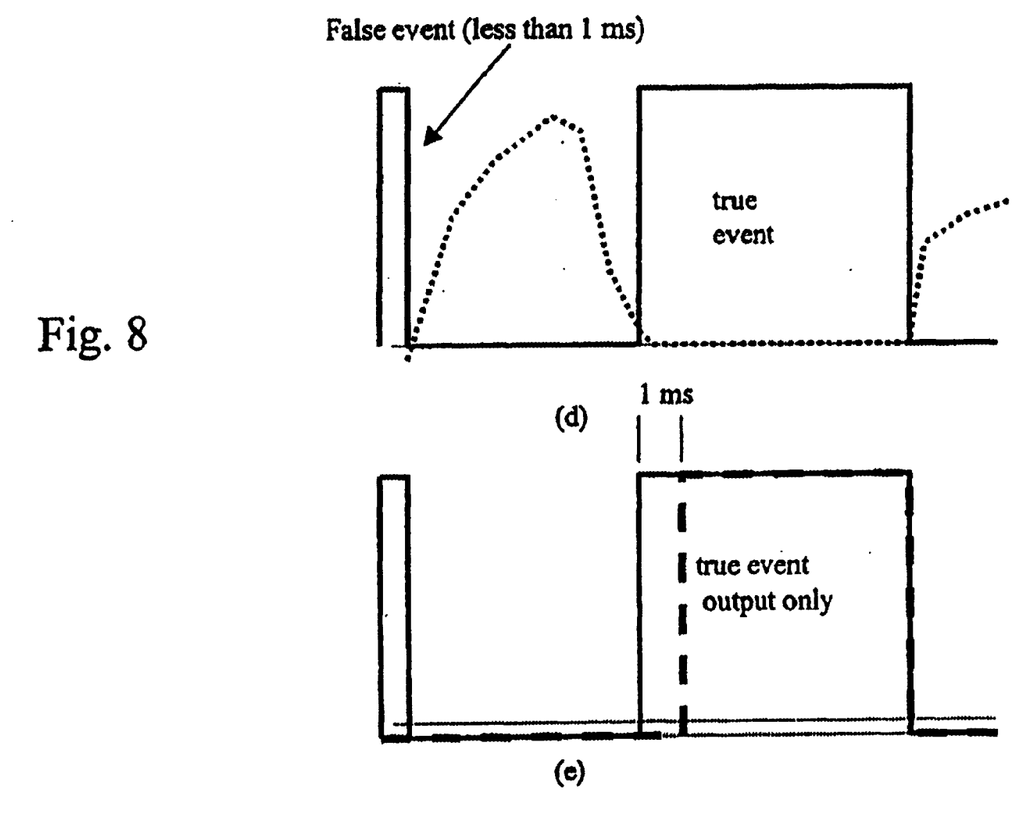
Figure 9:
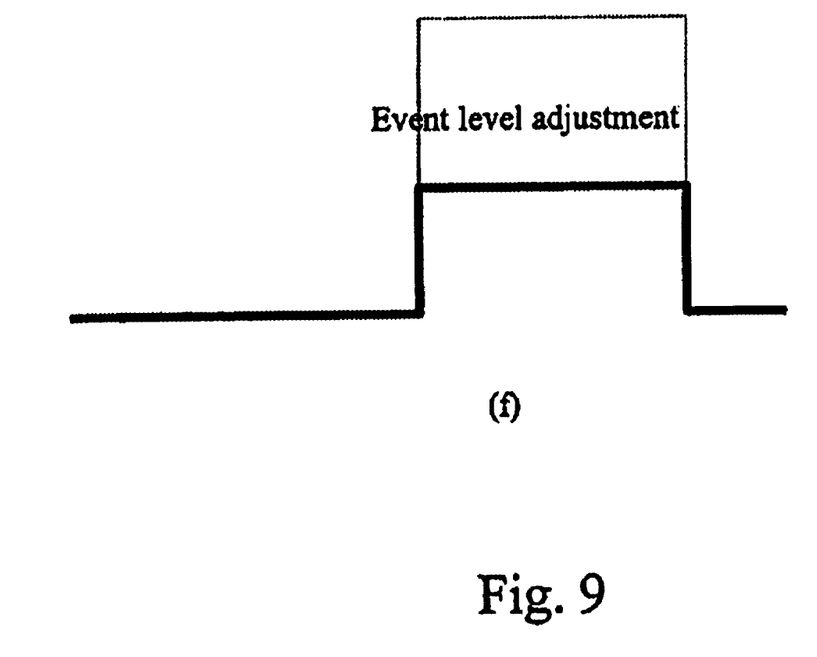
Figure 10:
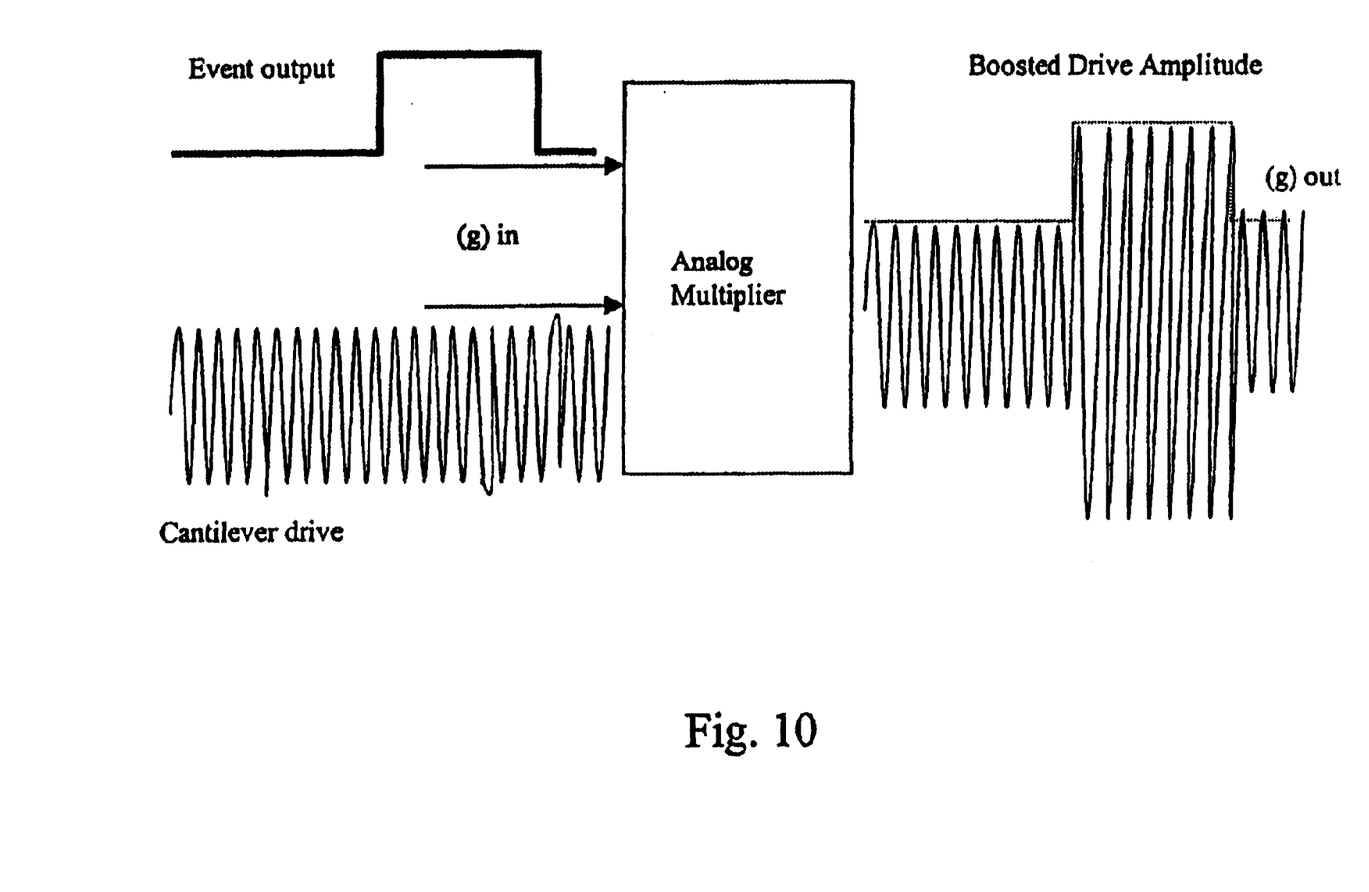

Waveform (d) then enters correction period with reset event detector circuitry 570 to produce waveform (e). As illustrated in FIG. 8, and discussed above, the event detector and hold off circuitry 560 and the correction period and reset event detector circuitry 570 ignores false events, such s those that are less than one millisecond. Accordingly, on events that are greater than one millisecond are detected and output as a dashed line waveform (e). Waveform (c) then enters event level setting circuitry 580 to adjust the pulse of the waveform (e) to the desired level by using a level setting input and to produce waveform (f) as illustrated in FIG. 9. Waveform (f) then proceeds through an analog multiplier 590 where it is combined with the cantilever drive signal to boost the drive amplitude resulting in waveform (g) as illustrated in FIG. 10. Boosted drive amplitude waveform (g) is then used to drive the probe 120. Note, if a parachuting event is not detected, the cantilever drive is applied directly to oscillator 130 (FIG. 1).

Figure 11:
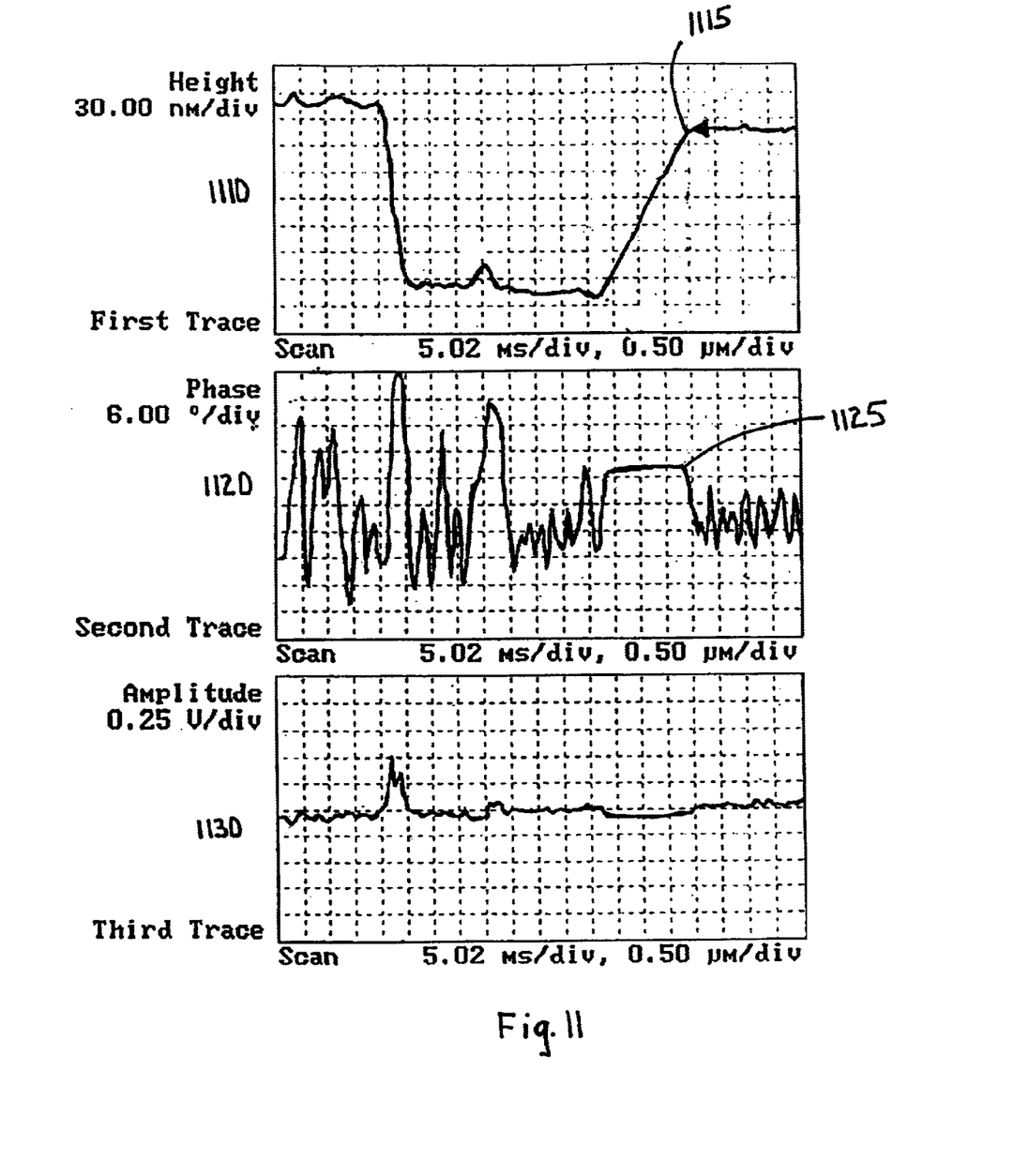
FIG. 11 is an exemplary illustration of resulting signals of a probe system without a paraboost module.

FIG. 11 is an exemplary illustration of resulting signals of a probe system without a paraboost module. The signals include a detected map signal 1110 of the surface 170 using a probe 120 scanning from right to left, a phase signal 1120 of the probe 120, and an amplitude of a drive signal 1130 to the probe 120. FIG. 11 shows how the probe begins parachuting in map signal 1110 at point 1115 when the phase signal 1120 is level (quiet) at point 1125, without using the paraboost module 110. Thus, without the use of paraboost module 110 the amplitude of the drive signal 1130 is not boosted to compensate for the parachuting.

Figure 12:
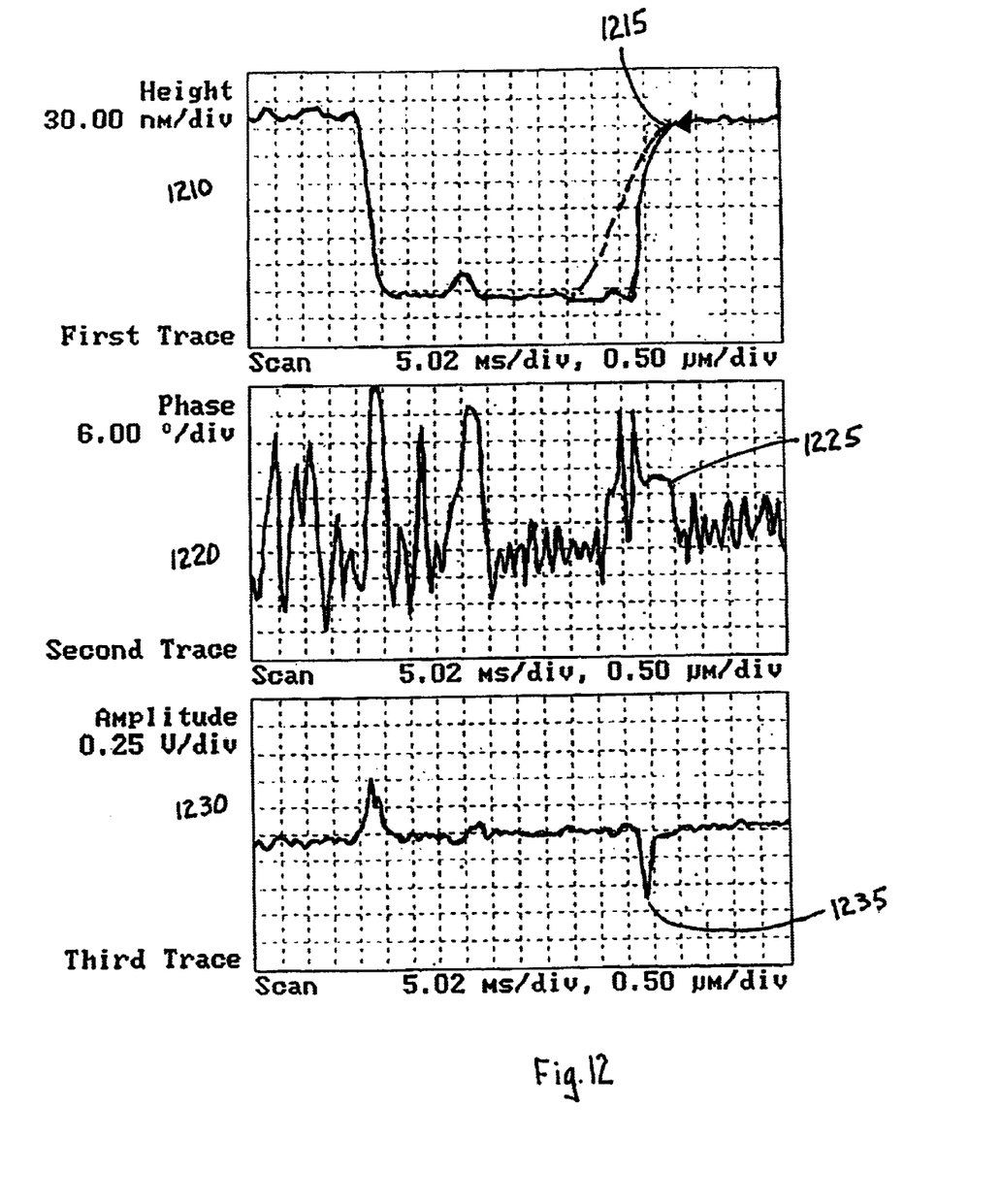
FIG. 12 is an exemplary illustration of resulting signals of a probe system when the paraboost module is used.

FIG. 12 is an exemplary illustration of resulting signals when the paraboost module 110 is used while other experimental conditions are identical to those associated with FIG. 11. The signals include the mapped surface signal 1210, the phase signal 1220, and the amplitude of the drive signal 1230. As illustrated, when the paraboost module 110 detects a leveling of the phase signal 1220 at point 1225 indicating an abrupt drop in the surface 170 at point 1215, the amplitude of the drive signal 1230 is adjusted at point 1235. In particular, the leveling of the phase signal is a reduction of the variation of a phase signal from the probe 120. Thus, the leveling is a quieting of the phase signal from the probe 120. Therefore, the paraboost module boosts the cantilever drive signal, the control module 150 integrates the error more rapidly and the Z-module 140 lowers the probe 120 faster. Accordingly, as shown in signal 1210, an abrupt variation in the surface 170 is more accurately detected.

Figure 13:
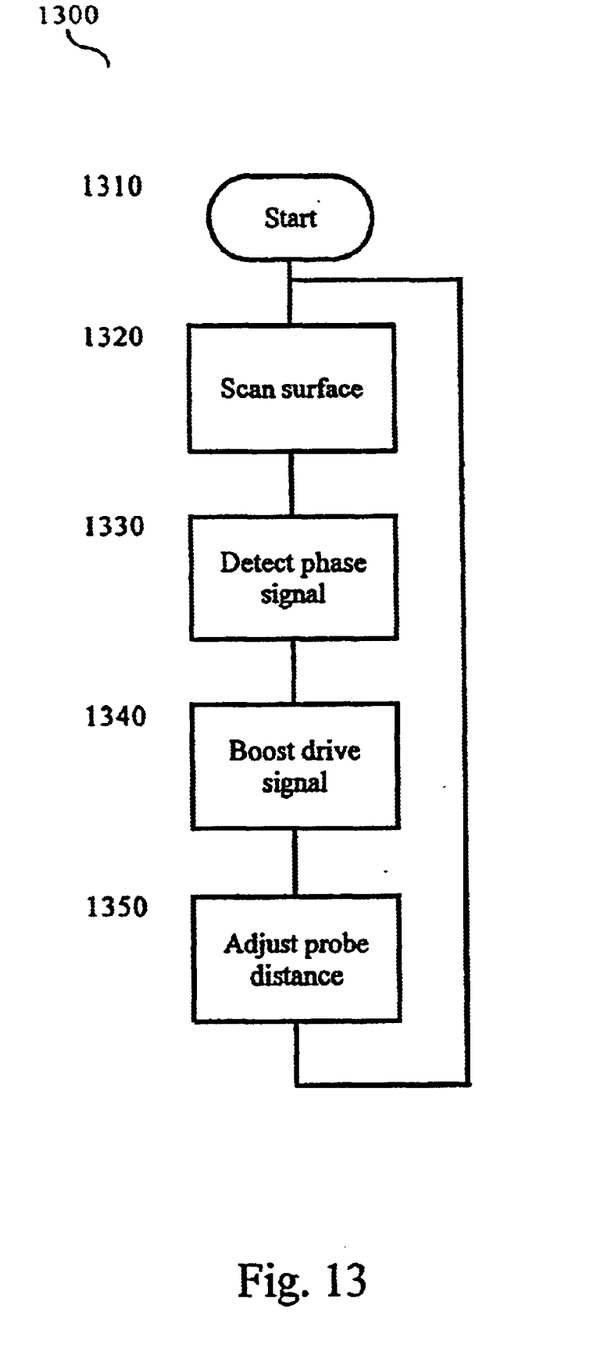
FIG. 13 is an exemplary flowchart of the operation of the paraboost system.

FIG. 13 is an exemplary flowchart of the operation of the paraboost system 100. The flowchart begins at step 1310. In step 1320, the probe 120 scans across the surface 170. In step 1330, the paraboost system 100 detects the phase signal of the probe 120. In step 1340, the paraboost system 100 boosts the drive signal of the probe 120. In step 1350, the paraboost system 100 adjusts the distance between the probe 120 and the surface 170. For example, the paraboost system 100 reduces the distance between the probe 120 and the surface 170 when the paraboost system 100 detects free oscillation of the probe 120. In particular, when free oscillation is detected, the paraboost system increases an error signal which in turn increases a drive signal of the Z-module 140 to reduce the distance between the probe 120 and the surface 170. For example, the error signal or the drive signal are boosted 20–30 percent.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. An apparatus for reducing the parachuting of an oscillating probe measuring the topography of a surface comprising:

a detector module operatively coupled to the oscillating probe; and a boost module operatively coupled to the detector module and the oscillating probe, wherein, the detector module detects a reduction of a variation of a phase signal from the oscillating probe and the boost module boosts a probe drive signal to the oscillating probe based on the phase signal detected by the detector module to produce a boosted probe drive signal.

2. The apparatus according to claim 1, wherein the detector module comprises:

a precision full wave rectifier; and an envelope detector coupled to the precision full wave rectifier, wherein the precision full wave rectifier rectifies a phase signal of the oscillating probe to produce a rectified phase signal and the envelope detector detects the rectified phase signal to produce an envelope detected signal.

3. The apparatus according to claim 2, wherein the detector module further comprises:

a comparator coupled to the envelope detector; and an event detector and hold off circuit coupled to the comparator, wherein the comparator and the event detector and hold off circuit generate an event signal from the envelope detected signal.

4. The apparatus according to claim 3, wherein the boost module further comprises a multiplier coupled to the event detector and hold off circuit; and wherein the multiplier combines the event signal with the probe drive signal to produce the boosted probe drive signal.

5. The apparatus according to claim 4, wherein the boost circuit further comprises an event level setting circuit coupled between the event detector and hold off circuit and the multiplier of the boost circuit, wherein the event level setting circuit sets an event level of the event signal.

6. The apparatus according to claim 4, wherein the boosted probe drive signal is 20 to 30 percent above the probe drive signal.

7. The apparatus according to claim 3, wherein the event detector and hold off circuit delays the generation of the event signal for a predetermined time.

8. A method for reducing the parachuting of an oscillating probe obtaining accurate information representative of a surface of a sample comprising:

scanning the surface of the sample with the oscillating probe;

measuring an oscillation of the oscillating probe so as to generate a phase signal;

detecting a reduction of a variation of the phase signal of the oscillating probe indicative of free oscillation of the oscillating probe; and reducing a distance between the oscillating probe and the sample in response to the detection of the reduction of the variation of the phase signal of the oscillating probe.

9. The method according to claim 8, wherein the detecting step further comprises:

rectifying the phase signal of the oscillating probe to produce a rectified phase signal; and envelope detecting the rectified phase signal of the oscillating probe to produce an envelope detected phase signal of the oscillating probe.

10. The method according to claim 8, wherein the reducing step further comprises boosting a probe drive signal of the oscillating probe to produce a boosted drive signal of the oscillating probe.

11. The method according to claim 10, wherein the detecting step further comprises generating an event trigger signal based on the detected phase signal with a comparator and the boosting step further comprises boosting the probe drive signal of the oscillating probe by combining the event trigger signal with the probe drive signal of the oscillating probe to produce a boosted drive amplitude signal.

12. The method according to claim 11, wherein the detecting step further comprises delaying the generation of the event trigger signal for a predetermined time.

13. The method according to claim 10, wherein the boosted drive signal is 20 to 30 percent above the probe drive signal.

14. The method according to claim 8, further comprising:

generating an error signal based on the phase signal of the oscillating probe when the oscillating amplitude of the oscillating probe is too high; and accumulating the error signal of the oscillating probe.

15. The method according to claim 8, further comprising:

generating an error signal based on the phase signal when the oscillating amplitude of the oscillating probe is too small; and accumulating the error signal.

16. The method according to claim 8, wherein the detecting step detects a reduction of a variation of a the phase signal when the phase difference between a probe drive signal and the oscillation is substantially 90 degrees.

17. The method according the claim 8, wherein the reducing step further comprises boosting a probe drive signal of the oscillating probe to increase the accumulation of an error signal based on the phase signal of the oscillating probe.

18. An apparatus for reducing the parachuting of a probe measuring the topography of a surface comprising:

a detection module coupled to the probe to detect parachuting of the probe;

a boost module coupled to the detection module, wherein the boost module reduces the parachuting of the probe in response to the detection of parachuting of the probe.

19. The apparatus according to claim 18, wherein the parachuting detection circuitry comprises a detector module and the parachuting reduction circuitry comprises a boost module.

* * * * *

UNITED STATES PATENT AND TRADEMARK OFFICE
CERTIFICATE OF CORRECTION

PATENT NO. : 6,838,889 B2
DATED : January 4, 2005
INVENTOR(S) : Su et al.

It is certified that error appears in the above-identified patent and that said Letters Patent is hereby corrected as shown below:

Column 7,
Lines 32 and 33, "boost circuit" should read -- boost module --
Line 35, "boost circuit" should read -- boost module --

Signed and Sealed this

Tenth Day of May, 2005

JON W. DUDAS
*Director of the United States Patent and Trademark Office*